United States Patent
Peng et al.

(10) Patent No.: US 11,050,342 B2
(45) Date of Patent: Jun. 29, 2021

(54) POWER CONVERTER WITH OVER TEMPERATURE PROTECTION COMPENSATION

(71) Applicant: Chicony Power Technology Co., Ltd., New Taipei (TW)

(72) Inventors: Tso-Jen Peng, New Taipei (TW); Ssu-Hao Wang, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/774,414

(22) Filed: Jan. 28, 2020

(65) Prior Publication Data
US 2020/0251983 A1 Aug. 6, 2020

Related U.S. Application Data

(60) Provisional application No. 62/800,048, filed on Feb. 1, 2019.

(30) Foreign Application Priority Data

Nov. 12, 2019 (TW) .................................. 108141050

(51) Int. Cl.
*H02M 1/32* (2007.01)
*H02M 3/335* (2006.01)

(52) U.S. Cl.
CPC ......... *H02M 1/32* (2013.01); *H02M 3/33523* (2013.01); *H02M 2001/327* (2013.01)

(58) Field of Classification Search
CPC ............. H02M 1/32; H02M 2001/327; H02M 3/335–33592
See application file for complete search history.

(56) References Cited

U.S. PATENT DOCUMENTS 5,892,354 A 4/1999 Nagao et al.
6,225,708 B1 5/2001 Furukawa et al.
(Continued)

FOREIGN PATENT DOCUMENTS

CN 102237808 A 11/2011
CN 102255483 A 11/2011
(Continued)

OTHER PUBLICATIONS

Office Action dated Oct. 7, 2020 of the corresponding Taiwan patent application No. 108141050.

*Primary Examiner* — Fred E Finch, III
*Assistant Examiner* — Rafael O De Leon Domenech
(74) *Attorney, Agent, or Firm* — Chun-Ming Shih; HDLS IPR Services

(57) ABSTRACT

A power converter with over temperature protection compensation includes a main conversion unit, a primary-side control unit, a secondary-side control unit, a secondary detection circuit, and an over temperature adjustment circuit. The secondary-side control unit obtains a secondary voltage change value through the secondary detection circuit, and the secondary-side control unit correspondingly provides a current change value to the over temperature adjustment circuit according to the secondary voltage change value. The over temperature adjustment circuit provides a temperature control voltage according to the current change value so that the secondary-side control unit determines whether an over temperature protection is activated according to the temperature control voltage.

6 Claims, 9 Drawing Sheets

(56) References Cited

U.S. PATENT DOCUMENTS

| | | | | |
|---|---|---|---|---|
| 7,149,098 B1* | 12/2006 | Chen | ................... | H02M 1/32 |
| | | | | 363/56.09 |
| 8,310,094 B2 | 11/2012 | Yamada et al. | | |
| 8,433,265 B2 | 4/2013 | Mcelwee | | |
| 2018/0287409 A1* | 10/2018 | Cheng | ................... | H02J 7/0068 |
| 2019/0089255 A1* | 3/2019 | Fu | ................... | H02M 1/08 |
| 2020/0014304 A1* | 1/2020 | Chang | ................... | H02M 1/36 |
| 2020/0336062 A1* | 10/2020 | Chen | ................... | H02M 1/096 |
| 2020/0343810 A1* | 10/2020 | Xu | ................... | H02M 1/083 |

FOREIGN PATENT DOCUMENTS

| | | |
|---|---|---|
| CN | 108804365 A | 11/2018 |
| EP | 1047179 B1 | 8/2007 |
| TW | 200841554 A | 10/2008 |
| TW | 201316159 A | 4/2013 |
| TW | 201419736 A | 5/2014 |
| TW | 201547317 A | 12/2015 |
| TW | 1584554 B | 5/2017 |

\* cited by examiner

POWER CONVERTER WITH OVER TEMPERATURE PROTECTION COMPENSATION

BACKGROUND

Technical Field

The present disclosure relates to a power converter with over temperature protection compensation, and more particularly to a power converter with over temperature protection compensation disposed on a secondary side of a conversion unit.

Description of Related Art

The statements in this section merely provide background information related to the present disclosure and do not necessarily constitute prior art.

In the technical field of power converters, the over temperature protection (OTP) mechanism of the internal controller of the power converter has always been indispensable. However, no matter whether the input voltage of the power converter is low or high, or the output current is light load or full load, the power converter must reach a fixed temperature or higher to activate (trigger) the over temperature protection. Therefore, when the input voltage or the output current of the power converter changes, the actual triggering point of the over temperature protection mechanism will be different. This will cause the controller to delay activating the over temperature protection mechanism, thereby increasing the risk of damaging the power converter.

Specifically, since the conversion efficiency of the power converter is different when the input voltage is low or high, or when the output current is light load or full load, the trigger point of the over temperature protection will actually be different due to different input voltages or output currents. Generally, the input voltage of the power converter is high, and the conversion efficiency is good so that the heat loss caused by the energy conversion is small. On the contrary, when the input voltage of the power converter is low, the conversion efficiency is poor, which causes more heat loss caused by energy conversion. Therefore, under the difference of the above conditions, the power converter will cause the actual trigger point of the over temperature protection mechanism to be different.

In the safety regulations after IEC62368, the maximum surface temperature of the controller's plastic case must not exceed 87° C. to limit abnormal conditions occur in the power converter. Therefore, in the above regulation and the input voltage of the power converter is high or the output current is full load or light load, it is easy to cause the power converter to actually be overloaded, but the over temperature protection mechanism has not been activated. In order to avoid this, it may be necessary to design the trigger point of the over temperature protection mechanism at the trigger point where the input voltage of the power converter is low or the output current is light load. However, if the design is below this trigger point and the input voltage of the power converter is high or the output current is full load, there is a large error from the trigger point of the actual over temperature protection mechanism, which makes the over temperature protection mechanism meaningless.

Therefore, how to design a power converter with over temperature protection compensation, which is set on the secondary side of the conversion unit and compensates for the over temperature protection point according to the input voltage of different voltage values or the output current of different loads to dynamically adjust the over temperature protection point is an important subject for inventors of the present disclosure.

SUMMARY

In order to solve the above-mentioned problems, a power converter with over temperature protection compensation is provided. The power converter with over temperature protection compensation includes a main conversion unit, a primary-side control unit, a secondary-side control unit, a secondary detection circuit, and an over temperature adjustment circuit. The main conversion unit has a primary side and a secondary side, the primary side is coupled to an input voltage, the secondary side is coupled to a secondary rectifier filter circuit. The primary-side control unit is coupled to the primary side. The secondary-side control unit is coupled to the primary-side control unit. The secondary detection circuit is coupled to the secondary side. The over temperature adjustment circuit is coupled to the secondary-side control unit. The secondary-side control unit obtains a secondary voltage change value through the secondary detection circuit, and the secondary-side control unit correspondingly provides a current change value to the over temperature adjustment circuit according to the secondary voltage change value. The over temperature adjustment circuit provides a temperature control voltage according to the current change value so that the secondary-side control unit determines whether an over temperature protection is activated according to the temperature control voltage.

In one embodiment, the secondary-side control unit turns off the main conversion unit through the primary-side control unit to activate the over temperature protection.

In one embodiment, the power converter further includes a protection switch. The protection switch is coupled to the secondary rectifier filter circuit. The secondary-side control unit turns off the protection switch to activate the over temperature protection.

In one embodiment, the over temperature adjustment circuit includes a temperature control resistor. The temperature control resistor generates a temperature control resistance according to an ambient temperature, and the current change value flows through the temperature control resistance to generate the temperature control voltage.

In one embodiment, the secondary-side control unit has a comparison unit. When the comparison unit determines that the temperature control voltage is less than a reference voltage, the secondary-side control unit activates the over temperature protection.

In one embodiment, the input voltage is higher, the current change value provided by the secondary-side control unit is higher, and the input voltage is lower, the current change value provided by the secondary-side control unit is lower.

In one embodiment, the power converter further includes an auxiliary winding. The auxiliary winding is coupled to the secondary detection circuit and the main conversion unit. The auxiliary winding obtains an auxiliary voltage corresponding to a change of the input voltage through the main conversion unit or the auxiliary winding obtains the auxiliary voltage corresponding to a change of an output current provided by the secondary rectifier filter circuit.

In one embodiment, the secondary detection circuit includes a resistor and a voltage division component. The resistor is coupled to the auxiliary winding. The voltage division component is coupled to the resistor. The voltage division component is a voltage division resistor or a capacitor, and a node between the resistor and the voltage division component is coupled to the secondary-side control unit; the resistor receives the auxiliary voltage, and provides the secondary voltage change value through the node according to the auxiliary voltage.

In one embodiment, the secondary detection circuit further includes a diode. The diode is coupled to the resistor. The diode limits a polarity of the auxiliary voltage.

In one embodiment, the secondary detection circuit is coupled to the secondary rectifier filter circuit, and knows the secondary voltage change value according to a change of an output current provided by the secondary rectifier filter circuit.

In one embodiment, the secondary detection circuit includes a detection resistor. The detection resistor is coupled to the secondary-side control unit and the secondary-side control unit. The output current flows through the detection resistor to generate the secondary voltage change value.

In one embodiment, the secondary-side control unit provides the secondary voltage change value according to a handshaking signal provided by a load.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawings as follows.

DETAILED DESCRIPTION

Figure 1:
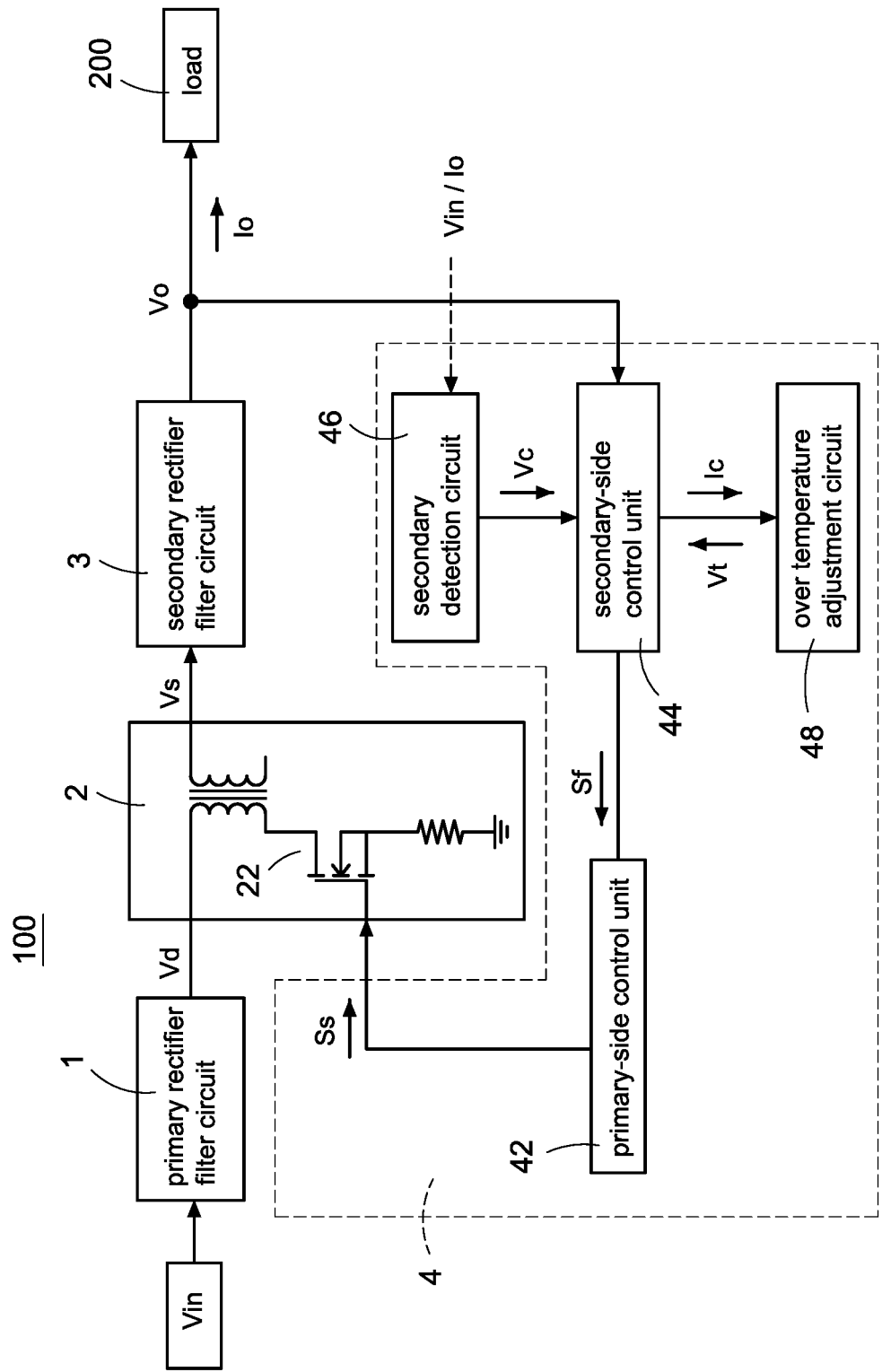
FIG. 1 is a block circuit diagram of a power converter with over temperature protection compensation according to a first embodiment of the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block circuit diagram of a power converter with over temperature protection compensation according to a first embodiment of the present disclosure. The power converter 100 receives an input voltage Vin and converters the input voltage Vin into an output voltage Vo for supplying power to a load 200. The power converter 100 is a power converter 100 that accepts a wide input voltage Vin with an acceptable input voltage Vin ranging from 90 volts to 264 volts. The power converter 100 includes a primary rectifier filter circuit 1, a main conversion unit 2, a secondary rectifier filter circuit 3, and a control module 4. A primary side of the main conversion unit 2 is coupled to the primary rectifier filter circuit 1, and a secondary side of the main conversion unit 2 is coupled to the secondary rectifier filter circuit 3. The control module 4 controls the main conversion unit 2 to convert the input voltage Vin into the output voltage Vo through a path composed of the primary rectifier filter circuit 1, the main conversion unit 2, and the secondary rectifier filter circuit 3, and the secondary rectifier filter circuit 3 provides the output voltage Vo and an output current Io to the load 200. The primary rectifier filter circuit 1 rectifies and filters the input voltage Vin into a DC voltage Vd, and the main conversion unit 2 converts the DC voltage Vd into a secondary voltage Vs by switching the power switch 22. The secondary rectifier filter circuit 3 rectifies and filters the secondary voltage Vs into the output voltage Vo, and provides the output voltage Vo and the output current Io required by the load 200 to the load 200.

The control module 4 includes a primary-side control unit 42, a secondary-side control unit 44, a secondary detection circuit 46, and an over temperature adjustment circuit 48. The primary-side control unit 42 is coupled to a power switch 22 of the main conversion unit 2 and provides a switching signal Ss to control the main conversion unit 2 converting the DC voltage Vd into the secondary voltage Vs. The secondary-side control unit 44 is coupled to the secondary rectifier filter circuit 3 and provides a feedback signal Sf to the primary-side control unit 42 according to the output voltage Vo so that the primary-side control unit 42 adjusts a duty cycle of the switching signal Ss according to the feedback signal Sf, thereby stabilizing a voltage value of the output voltage Vo. A coupling unit (not shown, for example but not limited to a photo coupler) may be used between the secondary-side control unit 44 and the primary-side control unit 42 so that the signal transmission between the primary-side control unit 42 and the secondary-side control unit 44 is electrically isolated. The secondary detection circuit 46 is coupled to the secondary-side control unit 44, and the secondary-side control unit 44 obtains a secondary voltage change value Vc through the secondary detection circuit 46. The over temperature adjustment circuit 48 is coupled to the secondary-side control unit 44, and the secondary-side control unit 44 correspondingly provides a current change value Ic to the over temperature adjustment circuit 48 according to the secondary voltage change value Vc. The over temperature adjustment circuit 48 provides the temperature control voltage Vt to the secondary-side control unit 44 according to the current change value Ic so that the secondary-side control unit 44 can determine whether an over temperature protection is activated according to the temperature control voltage Vt.

Specifically, the magnitude of the current change value Ic provided by the secondary-side control unit 44 is changed with the change of the secondary voltage change value Vc, and the power converter 100 has two parameters (indicated by dotted lines) that can affect the secondary voltage change value Vc. The first is: the magnitude of the secondary voltage change value Vc is changed with the change of the input voltage Vin. When the input voltage Vin is higher, the secondary voltage change value Vc provided by the secondary detection circuit 46 is higher so that the current change value Ic provided by the secondary-side control unit 44 is higher. When the input voltage Vin is lower, the secondary voltage change value Vc provided by the secondary detection circuit 46 is lower so that the current change value Ic provided by the secondary-side control unit 44 is lower. The second is: the magnitude of the secondary voltage change value Vc is changed with the change of the output current Io, i.e., as the load 200 is light, heavy, or overloaded. When the output current Io is higher, the secondary voltage change value Vc provided by the secondary detection circuit 46 is higher so that the current change value Ic provided by the secondary-side control unit 44 is higher. When the output current Io is lower, the secondary voltage change value Vc provided by the secondary detection circuit 46 is lower so that the current change value Ic provided by the secondary-side control unit 44 is lower. In one embodiment, the above examples of the output current Io may be reversed. That is, when the input voltage Vin is higher, the secondary voltage change value Vc provided by the secondary detection circuit 46 is higher so that the current change value Ic provided by the secondary-side control unit 44 is lower, and when the output current Io is higher, the secondary voltage change value Vc provided by the secondary detection circuit 46 is higher so that the current change value Ic provided by the secondary-side control unit 44 is lower, and the rest may be deduced by analogy and the detail description is omitted here for conciseness.

The over temperature adjustment circuit 48 provides the temperature control voltage Vt to the secondary-side control unit 44 according to the current change value Ic and an ambient temperature where the over temperature adjustment circuit 48 is located. Therefore, the over temperature protection point at which the over temperature protection is activated by the secondary-side control unit 44 changes with the input voltage Vin, or the over temperature protection point at which the over temperature protection is activated by the secondary-side control unit 44 changes with the output current Io. Therefore, through the above-mentioned compensation manner, the power converter 100 can avoid the over temperature protection from being triggered normally due to the difference in efficiency under the conditions of different input voltages Vin or different output currents Io, thereby avoiding the risk of delaying the over temperature protection.

Further, the power converter 100 with over temperature protection compensation according to the present disclosure compensates for the over temperature protection point of the over temperature protection according to the input voltage Vin or the output current Io, and therefore all detection manners can be applied in the present disclosure, which will be further described later.

Figure 2A:
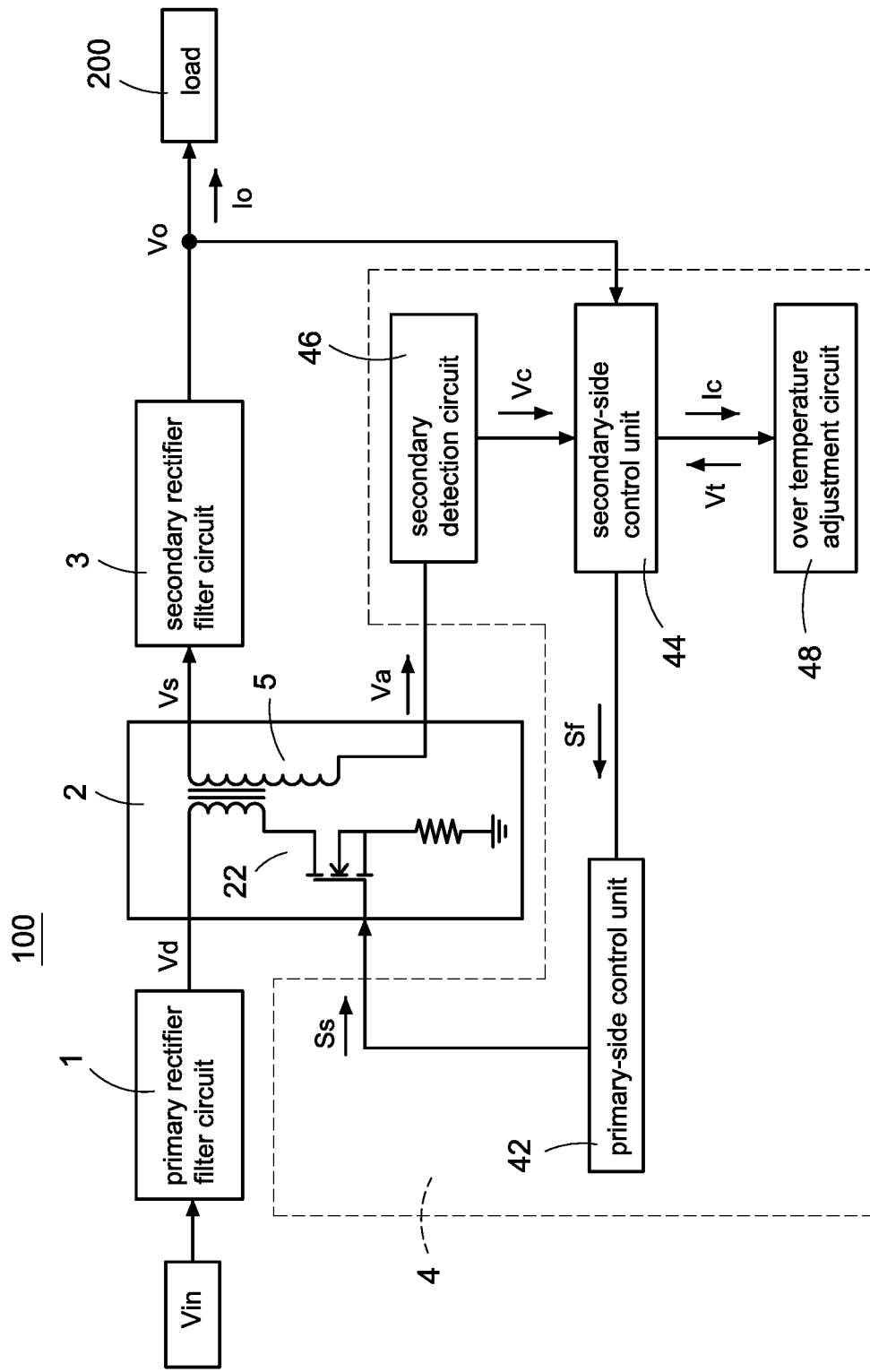
FIG. 2A is a block circuit diagram of a first detection manner of a primary detection circuit according to the present disclosure.
Figure 2B:
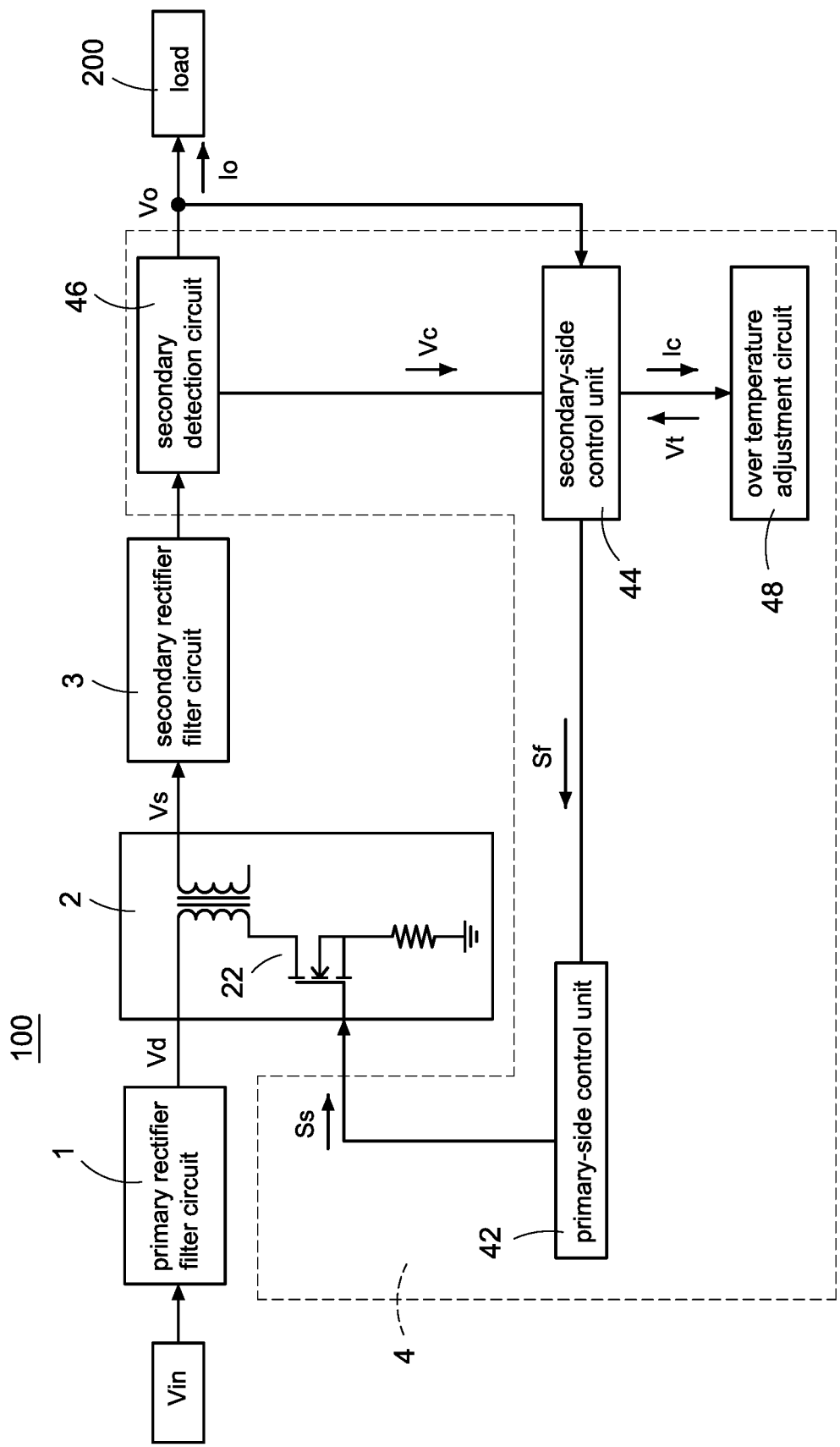
FIG. 2B is a block circuit diagram of a second detection manner of the primary detection circuit according to the present disclosure.
Figure 2C:
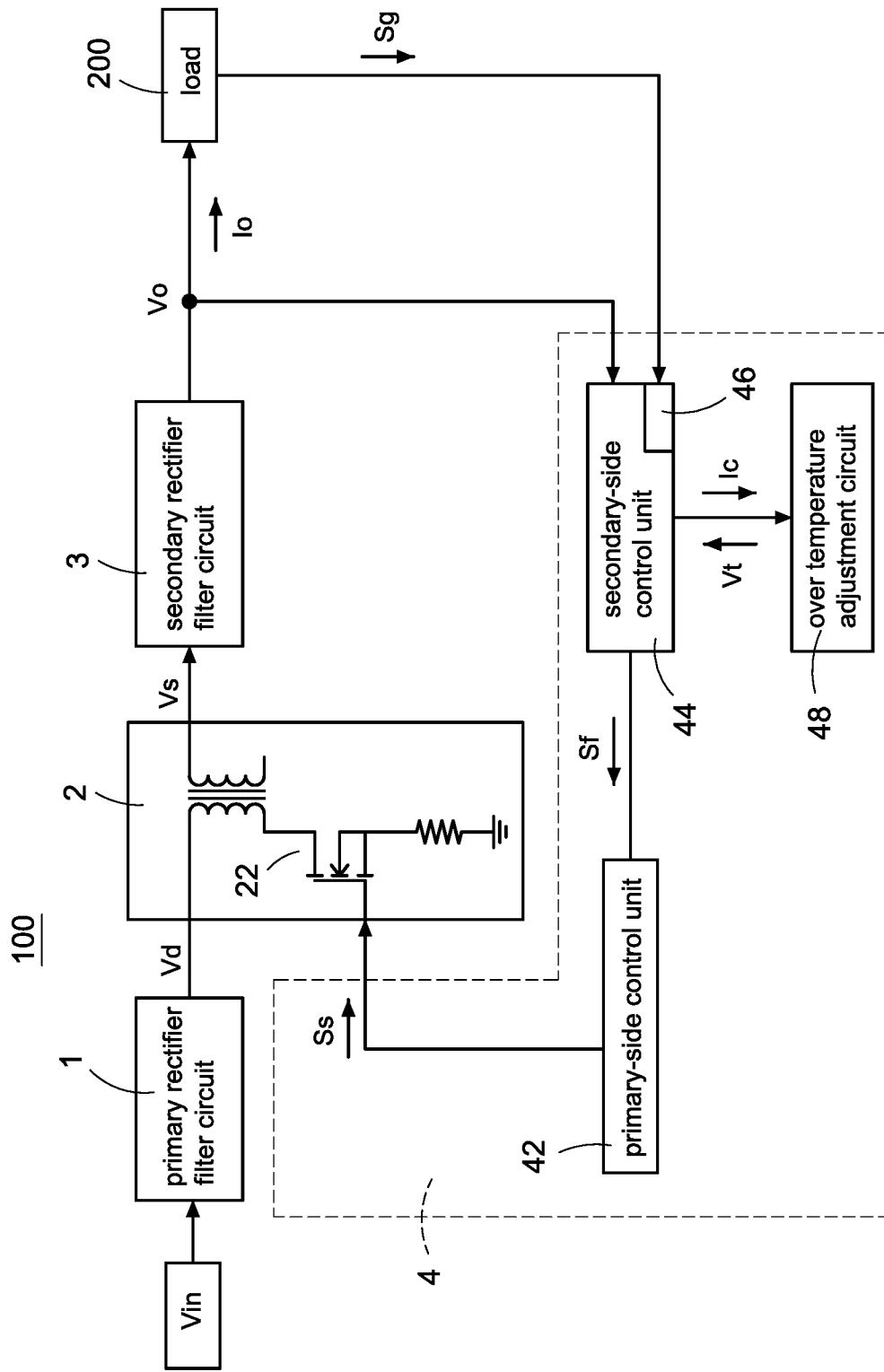
FIG. 2C is a block circuit diagram of a third detection manner of the primary detection circuit according to the present disclosure.

Please refer to FIG. 2A, which shows a block circuit diagram of a first detection manner of a primary detection circuit according to the present disclosure, please refer to FIG. 2B, which shows a block circuit diagram of a second detection manner of the primary detection circuit according to the present disclosure, please refer to FIG. 2C, which shows a block circuit diagram of a third detection manner of the primary detection circuit according to the present disclosure, and also refer to FIG. 1. As shown in FIG. 2A, the power converter 100 further includes an auxiliary winding 5. The auxiliary winding 5 is coupled to a secondary side of a transformer of the main conversion unit 2, and obtains an auxiliary voltage Va by means of electromagnetic coupling. The secondary detection circuit 46 is coupled to the auxiliary winding 5 and provides the secondary voltage change value Vc through the auxiliary voltage Va. When the input voltage Vin changes, the voltage value of the auxiliary voltage Va obtained from the auxiliary winding 5 changes with the input voltage Vin. Therefore, the change of the input voltage Vin can be known by detecting the auxiliary voltage Va on the auxiliary winding 5. Moreover, when the output current Io changes, the duty cycle of the auxiliary voltage Va obtained from the auxiliary winding 5 changes with the output current Io. Therefore, the change of the output current Io can be known by detecting the auxiliary voltage Va on the auxiliary winding 5. This detection manner can be suitable for detecting the voltage level of the input voltage Vin or the current level of the output current Io at the same time, and therefore the secondary-side control unit 44 should be determined which as the source according to the actual circuit conditions.

As shown in FIG. 2B, the secondary detection circuit 46 is coupled to the secondary rectifier filter circuit 3, and the secondary detection circuit 46 provides the secondary voltage change value Vc according to the output current Io. When the output current Io is provided to the load 200, the output current Io flows through the secondary detection circuit 46. Therefore, the change of the output current Io can be known by detecting the output current Io flowing through the secondary detection circuit 46. As shown in FIG. 2C, the secondary detection circuit 46 is a communication unit inside the secondary-side control unit 44, and the secondary-side control unit 44 is coupled to the load 200 through the communication unit. The secondary-side control unit 44 is communicated with the load 200 through the communication unit so that the secondary-side control unit 44 can obtain the secondary voltage change value Vc according to a handshaking signal Sg provided by the load 200. Specifically, according to the detection manner as shown in FIG. 2C, the load 200 and the secondary-side control unit 44 must has a controller with a power delivery (PD) function. The load 200 and the secondary-side control unit 44 communicate with each other. The secondary-side control unit 44 can know the voltage, current, temperature, power, and other information of the load 200 through the handshaking signal Sg provided by the load 200, thereby knowing the secondary voltage change value Vc.

Since the secondary detection circuit 46 includes at least the detection manners of FIG. 2A to FIG. 2C described above, its internal circuits shown in FIG. 2A and FIG. 2B must be different according to the detection manners described above in addition to the detection manner in FIG. 2C, the load 200 and the secondary-side control unit 44 are coupled by a communication line. Please refer to FIG. 3A, which shows a circuit diagram of the primary detection circuit according to a first embodiment of the present disclosure, and please refer to FIG. 3B, which shows a circuit diagram of the primary detection circuit according to a second embodiment of the present disclosure. As shown in FIG. 3A, and also refer to FIG. 2A, the secondary detection circuit 46 includes a resistor 462 and a voltage division component 464. The resistor 462 is coupled to the auxiliary winding 5 (as shown in FIG. 2A), and the voltage division component 464 is coupled to the resistor 462. A node A between the resistor 462 and the voltage division component 464 is coupled to the secondary-side control unit 44, and the resistor 462 receives the auxiliary voltage Va. The voltage value of the auxiliary voltage Va responds to change of the input voltage Vin, and the duty cycle of the voltage of the auxiliary voltage Va responds to the change of the output current Io. The voltage value of the auxiliary voltage Va is divided by the resistor 462 and the voltage division component 464, and the secondary voltage change value Vc at the node A is provided to the secondary-side control unit 42. In particular, the voltage division component 464 may be a voltage division resistor or a capacitor. If the voltage division component 464 is the voltage division resistor, the component cost is cheaper and the dynamic response is better. If the voltage division component 464 is the capacitor, it has the function of energy storage. Therefore, compared with the voltage division resistor, the value of the secondary voltage change value Vc is more stable but the dynamic response is poor.

The secondary detection circuit 46 further includes a diode D (indicated by dotted lines), and the diode D is coupled to the resistor 462. The diode D is used to limit a polarity of the auxiliary voltage Va to avoid the secondary voltage change value Vc from generating a voltage with wrong polarity. Specifically, the auxiliary voltage Va may have a negative voltage since the power switch 22 is switched on. If the auxiliary voltage Va is the negative, the secondary voltage change value Vc will be negative so that the secondary-side control unit 44 may be damaged due to failure to accept the negative voltage. However, if the secondary-side control unit 44 itself has a function of limiting the polarity of the secondary voltage change value Vc, this is not in this limit. Therefore, it is necessary to use the diode D to limit the polarity of the auxiliary voltage Va to avoid the above condition.

Figure 3B:
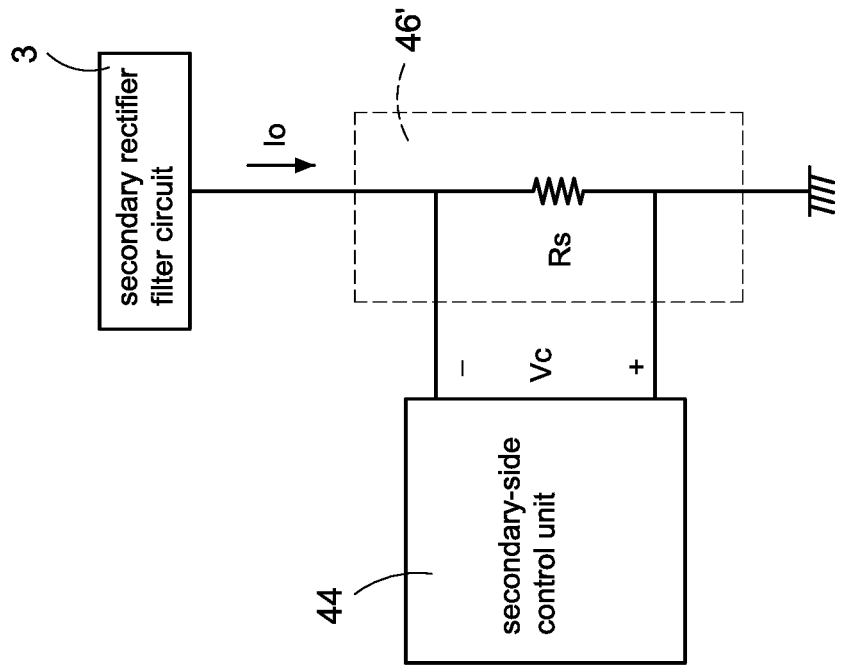
FIG. 3B is a circuit diagram of the primary detection circuit according to a second embodiment of the present disclosure.
Figure 3A:
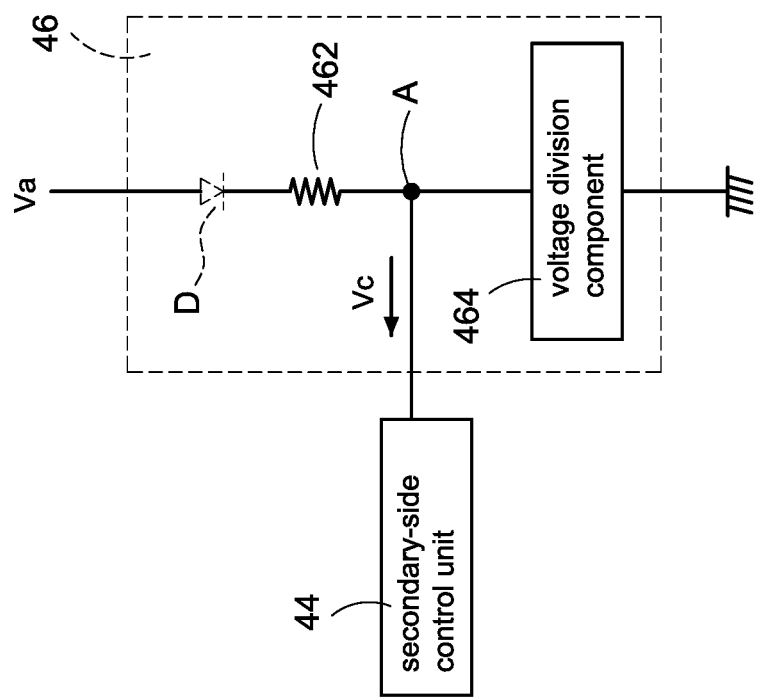
FIG. 3A is a circuit diagram of the primary detection circuit according to a first embodiment of the present disclosure.

As shown in FIG. 3B, and also refer to FIG. 2B. The secondary detection circuit 46' includes a detection resistor Rs. The detection resistor Rs is coupled to a path from the secondary rectifier filter circuit 3 to the load 200, and two ends of the detection resistor Rs are respectively coupled to two different ends of the secondary-side control unit 44. When the output current Io flows through the detection resistor Rs, the voltage drop (i.e., the secondary voltage change value Vc) across the detection resistor Rs changes. Therefore, the secondary-side control unit 44 can know the change of the change of the output current Io by detecting the voltage drop across the detection resistor Rs.

Figure 4:
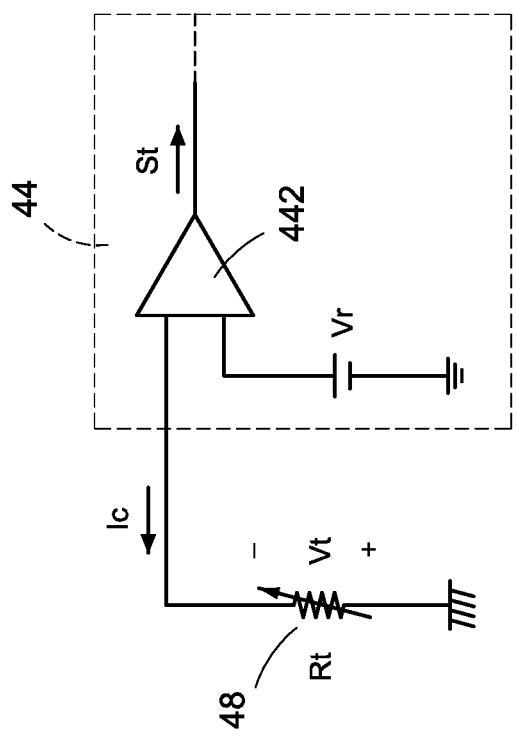
FIG. 4 is a circuit diagram of temperature comparison of an over temperature adjustment circuit and a primary-side control unit according to the present disclosure.

Please refer to FIG. 4, which shows a circuit diagram of temperature comparison of an over temperature adjustment circuit and a primary-side control unit according to the present disclosure, and also refer to FIG. 1 to FIG. 3B. The over temperature adjustment circuit 48 includes a temperature control resistor Rt (for example but not limited to a resistor with negative temperature coefficient), and the temperature control resistor Rt generates a temperature control resistance according to the ambient temperature of the location. When the ambient temperature is higher, the temperature control resistance is smaller, and when the ambient temperature is lower, the temperature control resistance is larger. When the current change value Ic flows through the temperature control resistor Rt, a voltage drop occurs across the temperature control resistor Rt, and the voltage drop is defined as a temperature control voltage Vt. The secondary-side control unit 44 includes a comparison unit 422, and one input end of the comparison unit 422 receives the temperature control voltage Vt and the other input end of the comparison unit 422 receives a reference voltage Vr. The comparison unit 422 compares the temperature control voltage Vt with the reference voltage Vr to determine whether an over temperature signal St is provided from the comparison unit 422 so that the secondary-side control unit 44 provides the over temperature protection according to whether the over temperature signal St is received.

Specifically, since the current change value Ic changes with the input voltage Vin or the output current Io, and the temperature control resistance changes with the ambient temperature, the temperature control voltage Vt will change with the input voltage Vin and the ambient temperature (or with the output current Io and the ambient temperature) at the same time. Afterward, the secondary-side control unit 44 knows whether the over temperature protection is activated by comparing the temperature control voltage Vt with the reference voltage Vr having a fixed voltage value. In particular, the voltage value of the reference voltage Vr is the over temperature protection point.

Please refer to FIG. 1 to FIG. 4, and take the input voltage Vin for example. When the input voltage Vin is higher (for example but not limited to 264 volts), the voltage value of the secondary voltage change value Vc obtained by the detection manners shown in FIG. 2A is higher so that the secondary-side control unit 44 generates the current change value Ic having a higher current value according to the secondary voltage change value Vc having a higher voltage value. When the input voltage Vin is lower (for example but not limited to 90 volts), the voltage value of the secondary voltage change value Vc obtained by the detection manners shown in FIG. 2A is lower so that the secondary-side control unit 44 generates the current change value Ic having a lower current value according to the secondary voltage change value Vc having a lower voltage value.

When the ambient temperature is fixed (i.e., the temperature control resistance is fixed) and the input voltage Vin is 264 volts, the temperature control voltage Vt obtained by the secondary-side control unit 44 is higher than that when the input voltage Vin is 90 volts so that the voltage value of the temperature control voltage Vt when the input voltage Vin is 264 volts is father from the over temperature protection point (i.e., the reference voltage Vr) than when the input voltage Vin is 90 volts. Therefore, if the ambient temperature changes, when the input voltage Vin is 264 volts, the higher ambient temperature (relative to the input voltage Vin of 90 volts) is required to trigger over temperature protection. When the input voltage Vin is 90 volts, it is the opposite of the case when the input voltage is 264 volts, and will not be repeated here. In addition, the current change value Ic provided by the secondary-side control unit 44 may be a value that linearly changes according to the linear change of the input voltage Vin (i.e., the curve of the current change value Ic is proportional to the curve of the linear change of the input voltage Vin), or the current change value Ic may be a value that changes in stages according to the linear change of the input voltage Vin (for example but not limited to the changed points are 90 volts, 170 volts, or 264 volts), that can be adjusted according to the resolution set by the primary-side control unit 42. In addition, when the same example as described above is applied to the embodiment in FIG. 3B for detecting the current level of the output current Io, the change of the current change value Ic is proportional to the current level of the output current Io, which is similar to the difference between the above-mentioned input voltage Vin, and will not be described again here.

Take the circuit of FIG. 4 and the circuits of FIG. 2A and FIG. 3A as an exemplified demonstration, and the secondary voltage change value Vc changes with the change of the input voltage Vin. It is assumed that the secondary-side control unit 44 activates the over temperature protection and the over temperature protection point is 0.5 volts (i.e., the reference voltage Vr is 0.5 volts) when a temperature of a case of the power converter 100 is 90° C. Under this condition, it is assumed that the temperature control resistance of the temperature control resistor Rt is 1 ohm when the input voltage Vin is 90 volts, and the temperature control resistance of the temperature control resistor Rt is 2 ohms when the input voltage Vin is 264 volts. When the input voltage Vin is 90 volts, the secondary-side control unit 44 knows that the input voltage Vin is 90 volts according to the secondary voltage change value Vc and provides the current change value Ic with 500 mA to the temperature control resistor Rt. At this condition, when the temperature of the case of the power converter 100 reaches 90° C., the temperature control voltage Vt is 0.5 volts generated from the temperature control resistor Rt (1 ohm) and the current change value Ic (500 mA), i.e., 0.5 volts=1 ohm*500 mA. Therefore, the secondary-side control unit 44 provides the over temperature protection. When the input voltage Vin is 264 volts, the secondary-side control unit 44 knows that the input voltage Vin is 264 volts according to the secondary voltage change value Vc and provides the current change value Ic with 250 mA to the temperature control resistor Rt. At this condition, when the temperature of the case of the power converter 100 reaches 90° C., the temperature control voltage Vt is 0.5 volts generated from the temperature control resistor Rt (2 ohms) and the current change value Ic (250 mA), i.e., 0.5 volts=2 ohms*500 mA. Therefore, the secondary-side control unit 44 provides the over temperature protection. The same example above is applied to the case where the secondary voltage change value Vc changes with the change of the output current Io (i.e., the load condition is known from the duty cycle of the voltage of the auxiliary voltage Va), and the calculation of its over temperature protection is similar to the case where the secondary voltage change value Vc changes with the change of the input voltage Vin. When the output current Io is overloaded (known by the duty cycle), the secondary-side control unit 44 knows that the output current Io is overloaded according to the secondary voltage change value Vc. At this condition, a delay time is internally set by the secondary-side control unit 44. When the output current Io is overloaded and the delay time is exceeded, the secondary-side control unit 44 changes the current change value Ic to 200 mA. Under the overloaded condition, the resistance of the temperature control resistor Rt must be less than 2 ohms since the ambient temperature rises and the resistance of the temperature control resistor Rt becomes smaller. Therefore, the temperature control voltage Vt generated from the temperature control resistor Rt (<2 ohms, it is assumed to be 1.5 ohms) and the current change value Ic (200 mA) must be less than the over temperature protection point (i.e., 1.5 ohms*200 mA<0.5 volts). Therefore, the secondary-side control unit 44 provides the over temperature protection.

Take the circuit of FIG. 4 and the circuits of FIG. 2B and FIG. 3B as an exemplified demonstration, the calculation manner of the over temperature protection is similar to the case where the secondary voltage change value Vc changes with the change of the output current Io. That is, when the load 200 is light load, the output current Io is lower so that the voltage drop across the detection resistor Rs (i.e., the secondary voltage change value Vc) is lower. When the load 200 is full load, the output current Io is higher so that the voltage drop across the detection resistor Rs (i.e., the secondary voltage change value Vc) is higher. When the load 200 is overloaded, a delay time is internally set by the secondary-side control unit 44. When the overload is still exceeded after the delay time, the secondary-side control unit 44 will reduce the current change value Ic. The rest of the calculation, that is, the control manner is the same as the case where the secondary voltage change value Vc changes with the change of the output current Io, and will not be described again here.

Figure 5A:
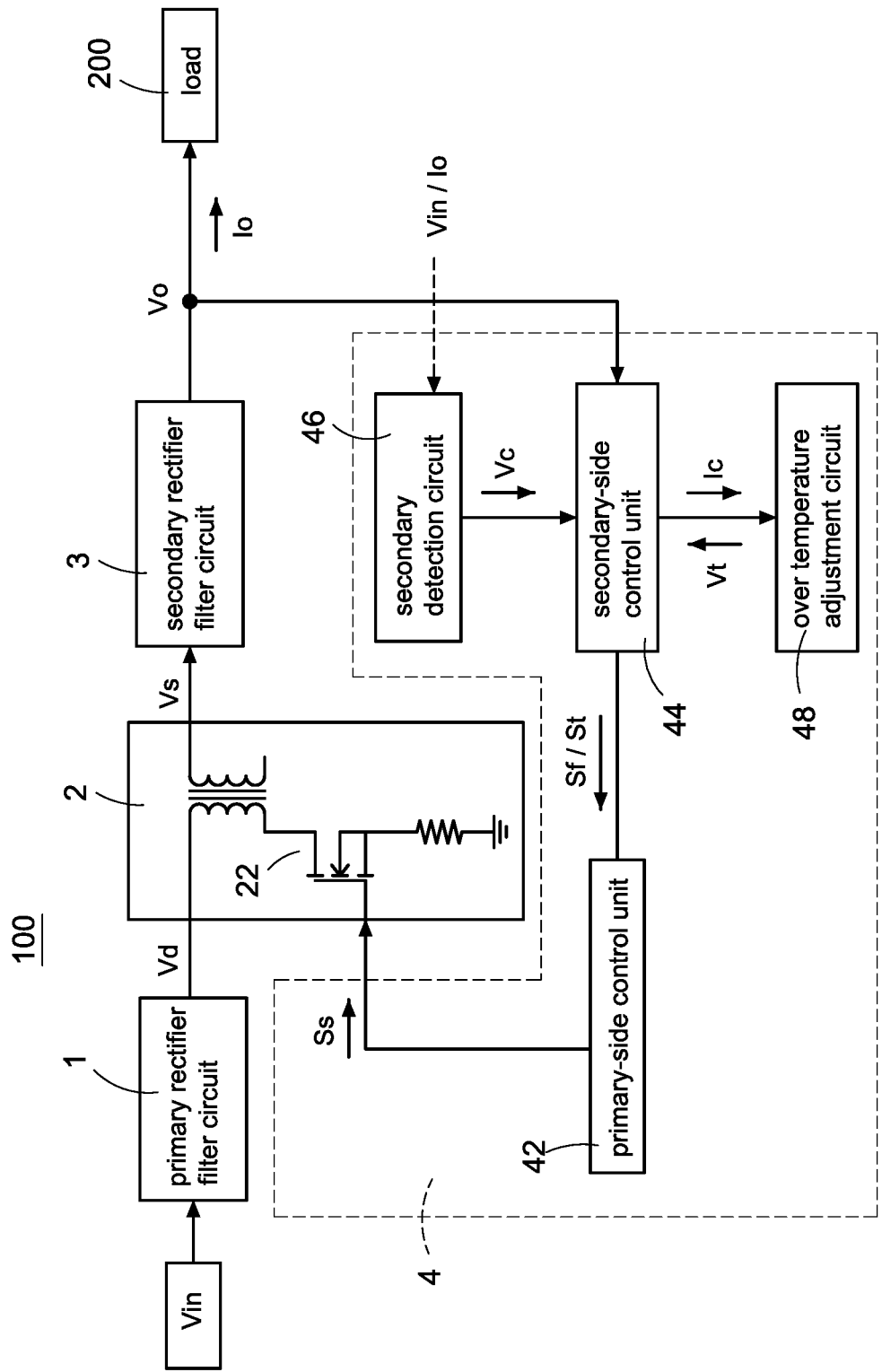
FIG. 5A is a block circuit diagram of an over temperature protection manner according to a first embodiment of the present disclosure.
Figure 5B:
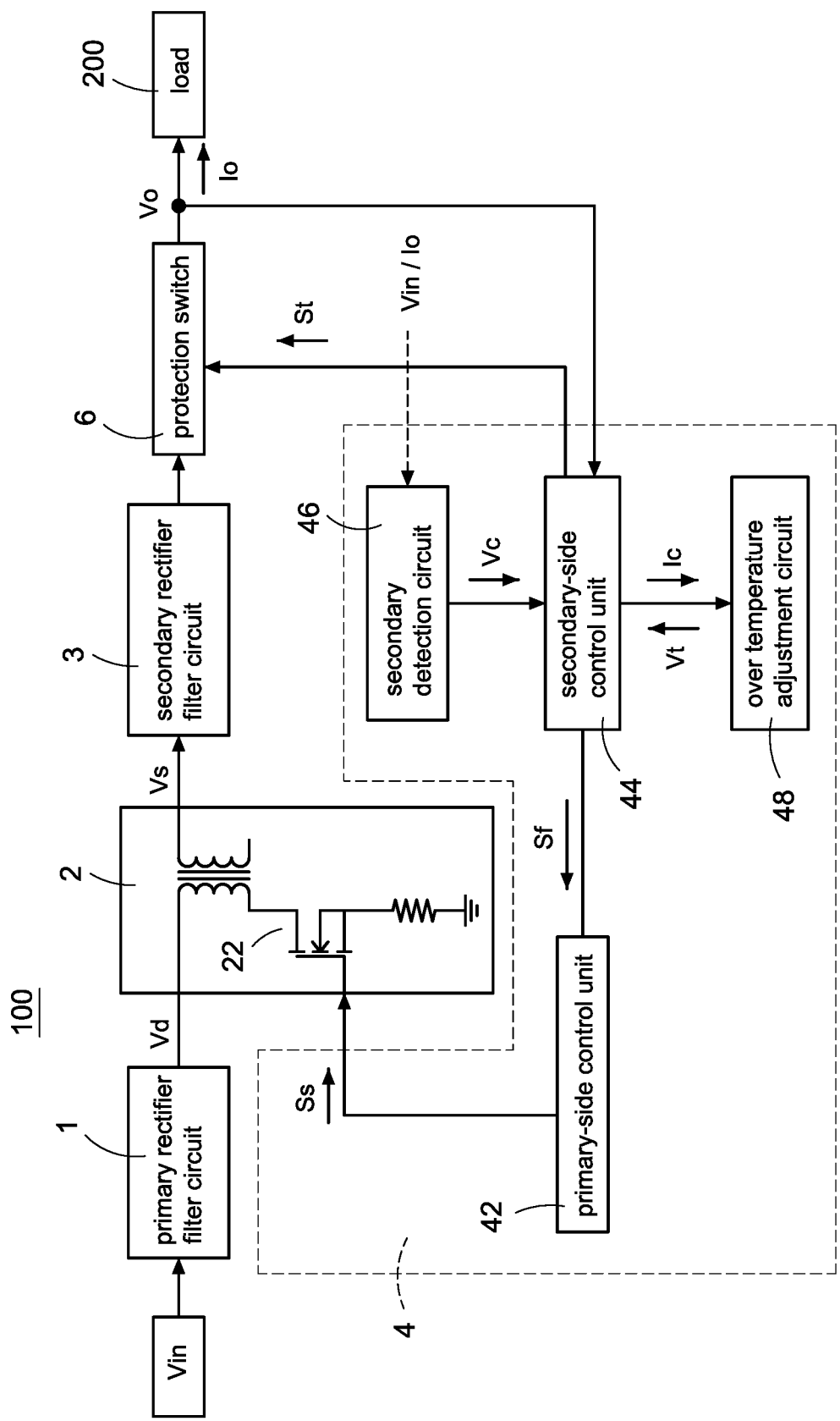
FIG. 5B is a block circuit diagram of the over temperature protection manner according to a second embodiment of the present disclosure.

Please refer to FIG. 5A, which shows a block circuit diagram of an over temperature protection manner according to a first embodiment of the present disclosure, please refer to FIG. 5B, which shows a block circuit diagram of the over temperature protection manner according to a second embodiment of the present disclosure, and also refer to FIG. 1 to FIG. 4. The secondary-side control unit 44 has at least two protection manners for over temperature protection. The protection manners can be selected according to the actual conditions of the circuit. As shown in FIG. 5A, when the secondary-side control unit 44 receives the over temperature signal St provided by the comparison unit 442, the secondary-side control unit 44 provides a protection signal Sp corresponding to the over temperature signal St to the primary-side control unit 42. After the primary-side control unit 42 receives the protection signal Sp, the primary-side control unit 42 turns off the main conversion unit 2 by turning off the power switch 22 so that the main conversion unit 2 is no longer in operation to provide the over temperature protection. As shown in FIG. 5B, a protection switch 6 is connected in series to a path from the secondary rectifier filter circuit 3 to the load 200. The protection switch 6 is used to provide fault protection in the event of the power converter 100 failure, and the protection switch 6 is a necessary component in the power converter 100 having a power delivery function. Therefore, when the over temperature occurs in the power converter 100, the protection switch 6 can also be used to perform the over temperature protection. When the secondary-side control unit 44 receives the over temperature signal St provided by the comparison unit 442, the secondary-side control unit 44 provides a protection signal Sp corresponding to the over temperature signal St to the protection switch 6 so that the secondary-side control unit 44 turns off the protection switch 6 to disconnect the path from the secondary rectifier filter circuit 3 to the load 200 to activate the over temperature protection.

Figure 6:
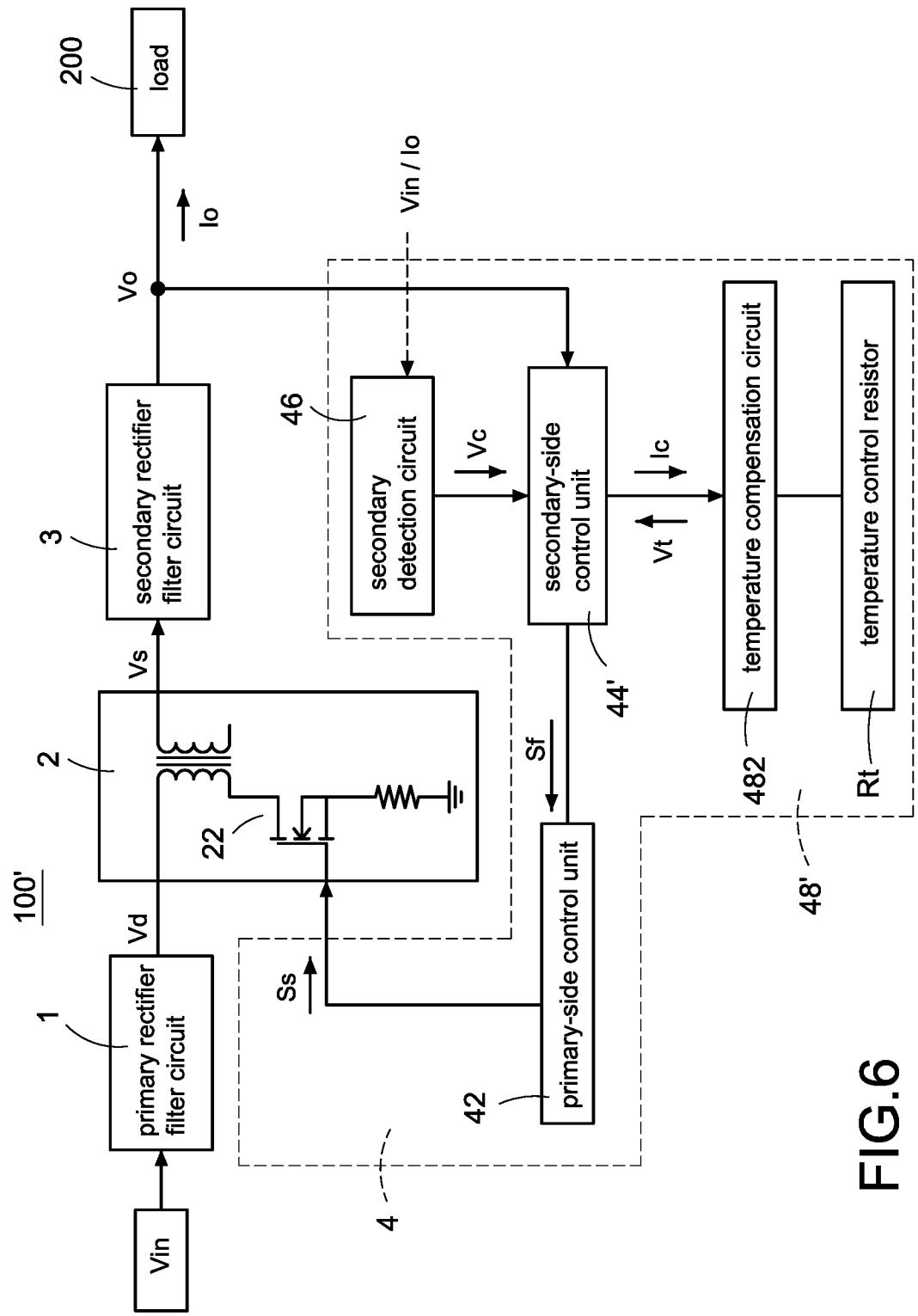
FIG. 6 is a block circuit diagram of the power converter with over temperature protection compensation according to a second embodiment of the present disclosure.

Please refer to FIG. 6, which shows a block circuit diagram of the power converter with over temperature protection compensation according to a second embodiment of the present disclosure, and also refer to FIG. 1 to FIG. 5B. The difference between second embodiment and the first embodiment shown in FIG. 1 is that the secondary-side control unit 44' generates a current fixed value If according to the secondary voltage change value Vc and provides the current fixed value If to the over temperature adjustment circuit 48'. That is, the current fixed value If does not change with the change of the input voltage Vin or the change of the output current Io. The over temperature adjustment circuit 48' has a resistance change value that generates a resistance change according to the input voltage Vin in addition to a temperature control resistance according to the ambient temperature of the location. The over temperature adjustment circuit 48' provides the temperature control voltage Vt to the secondary-side control unit 44' according to the current fixed value If and the resistance change value so that the secondary-side control unit 44' can determine whether the over temperature protection is activated according to the temperature control voltage Vt.

Specifically, the over temperature adjustment circuit 48' includes a temperature compensation circuit 482 and a temperature control resistor Rt, and the temperature compensation circuit 482 is coupled to the secondary-side control unit 44' and the temperature control resistor Rt. The temperature control resistor Rt is the same as the embodiment in FIG. 4, and the temperature control resistor Rt generates a temperature control resistance according to an ambient temperature where the over temperature adjustment circuit 48' is located, and the temperature compensation circuit 482 correspondingly generates a resistance change value according to the change of the input voltage Vin. When the input voltage Vin is higher (for example but not limited to 264 volts), a higher resistance change value is provided by the temperature compensation circuit 482; when the input voltage Vin is lower (for example but not limited to 90 volts), a lower resistance change value is provided by the temperature compensation circuit 482. When the current fixed value If flows through the over temperature adjustment circuit 48', a first temperature control voltage is generated on the temperature compensation circuit 482 (that is, the first temperature control voltage is the product of the resistance change value and the current fixed value If), and a second temperature control voltage is generated across the temperature control resistor Rt. The first temperature control voltage plus the second temperature control voltage is the temperature control voltage Vt. Afterward, the secondary-side control unit 44' determines whether an over temperature protection is activated according to the temperature control voltage Vt.

In one embodiment, the temperature compensation circuit 482 is not limited to the coupling manner as shown in FIG. 5, and may be coupled between the secondary-side control unit 44' and the temperature control resistor Rt, or between the temperature control resistor Rt and the ground point. In one embodiment, the unexplained circuit structure and control manner of the power converter 100' according to the second embodiment of FIG. 6 are the same as those of FIG. 1. The detection manner applicable to the secondary voltage change value Vc of FIG. 2A to FIG. 2C and the internal structure of the secondary detection circuit 46 are also applicable to the circuit structures of FIG. 3A to FIG. 3B, and will not be described again here.

In summary, the main advantages and effects of the embodiments of the present disclosure are that the power converter with over temperature protection compensation of the present disclosure compensates over temperature protection points of the over temperature protection according to the voltage level of the input voltage. Therefore, the over temperature protection points of the over temperature protection activated by the secondary-side control unit change with the voltage level of the input voltage. Accordingly, through the above-mentioned compensation manner, the over temperature protection cannot be triggered normally due to the difference in efficiency under the conditions of different input voltages or different output currents of the power converter, thereby avoiding the risk of delaying over temperature protection.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power converter with over temperature protection compensation, comprising:
a main conversion unit having a primary side and a secondary side, the primary side coupled to an input voltage, the secondary side coupled to a secondary rectifier filter circuit,
a primary-side control unit coupled to the primary side,
a secondary-side control unit coupled to the primary-side control unit,
a secondary detection circuit coupled to the secondary side, and
an over temperature adjustment circuit coupled to the secondary-side control unit,
wherein the secondary-side control unit is configured to obtain a secondary voltage change value through the secondary detection circuit, and the secondary-side control unit is correspondingly configured to provide a current change value to the over temperature adjustment circuit according to the secondary voltage change value; the over temperature adjustment circuit is configured to provide a temperature control voltage according to the current change value so that the secondary-side control unit is configured to determine whether an over temperature protection is activated according to the temperature control voltage;
wherein the secondary-side control unit is configured to provide the secondary voltage change value according to a handshaking signal provided by a load.

2. The power converter in claim 1, wherein the secondary-side control unit is configured to turn off the main conversion unit through the primary-side control unit to activate the over temperature protection.

3. The power converter in claim 1, further comprising:
a protection switch coupled to the secondary rectifier filter circuit,
wherein the secondary-side control unit is configured to turn off the protection switch to activate the over temperature protection.

4. The power converter in claim 1, wherein the over temperature adjustment circuit comprises a temperature control resistor, the temperature control resistor is configured to generate a temperature control resistance according to an ambient temperature, and the current change value flows through the temperature control resistance to generate the temperature control voltage.

5. The power converter in claim 1, wherein the secondary-side control unit comprises a comparison unit; when the comparison unit is configured to determine that the temperature control voltage is less than a reference voltage, the secondary-side control unit is configured to activate the over temperature protection.

6. The power converter in claim 1, wherein the input voltage is higher, the current change value provided by the secondary-side control unit is higher, and the input voltage is lower, the current change value provided by the secondary-side control unit is lower.

* * * * *